(12) United States Patent
Tuma et al.

(10) Patent No.: US 7,155,633 B2
(45) Date of Patent: Dec. 26, 2006

(54) EXCHANGE SERVER METHOD AND SYSTEM

(75) Inventors: Wade B. Tuma, Reno, NV (US); George B. Tuma, Scotts Valley, CA (US)

(73) Assignee: Solid Data Systems, Inc., Santa Clara, CA (US)

( * ) Notice: Subject to any disclaimer, the term of this patent is extended or adjusted under 35 U.S.C. 154(b) by 522 days.

(21) Appl. No.: 10/731,636

(22) Filed: Dec. 8, 2003

(65) Prior Publication Data

US 2005/0144520 A1    Jun. 30, 2005

(51) Int. Cl.
*G06F 11/00* (2006.01)
(52) U.S. Cl. .............................. 714/5; 714/6; 711/161; 711/162
(58) Field of Classification Search .................. 714/5, 714/6; 711/161, 162
See application file for complete search history.

(56) References Cited

U.S. PATENT DOCUMENTS

| | | | | | |
|---|---|---|---|---|---|
| 5,642,496 | A | * | 6/1997 | Kanfi | 711/162 |
| 5,765,173 | A | * | 6/1998 | Cane et al. | 707/204 |
| 5,966,730 | A | * | 10/1999 | Zulch | 711/162 |
| 6,205,527 | B1 | * | 3/2001 | Goshey et al. | 711/162 |
| 6,799,258 | B1 | * | 9/2004 | Linde | 711/162 |
| 2002/0129108 | A1 | * | 9/2002 | Sykes, Jr. | 709/206 |
| 2004/0199552 | A1 | * | 10/2004 | Ward et al. | 707/204 |
| 2005/0108484 | A1 | * | 5/2005 | Park | 711/162 |

* cited by examiner

*Primary Examiner*—Robert Beausoliel
*Assistant Examiner*—Matthew Urick
(74) *Attorney, Agent, or Firm*—Morrison & Foerster LLP

(57) ABSTRACT

A method, system and computer program for a computer message storage system such as electronic mail. This involves instancing a software archiver to relocate messages according to age and instancing a software backup subsystem to backup storage groups, to maintain a patch file and to copy to a backup file.

8 Claims, 7 Drawing Sheets

EXCHANGE SERVER METHOD AND SYSTEM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A COMPACT DISK APPENDIX

Not applicable.

FIELD OF THE INVENTION

This disclosure relates to computers and to data provision, service and recovery, and more particularly to support of service levels and recovery of databases of messages, for example electronic mail messages.

BACKGROUND OF THE INVENTION

Storage devices intended primarily to provide persistent memory for computer databases are commonplace. Such devices include rotating disk drive stores and non-volatile, battery power-backed semiconductor memories.

In order to provide higher performance storage devices than those of previously developed solutions, extremely large arrays of semiconductor memories, known as SSD (solid state disk stores) have been used as storage devices on storage area networks.

An important application for SSD (solid state disk stores) is implementation of large databases to store representations of messages such as electronic mail or email exchanged between personal computers. However such databases can become very large and beyond the economic capacity of solid state stores.

Usage of such databases is commonplace. This has led to the development of efficient, scalable supporting software and equipment sometimes referred to as "messaging engines". Some messaging engines may support, theoretically at least, many thousands of users on a single server computer or, typically, a messaging engine may support a single local group of intimately connected server computers or similar configurations.

However, problems and limitations have tended to impose an upper limit as to the number of uses that can be effectively deployed on a single server (computer) or server group (of computers). Such problems and limitations include issues related to availability and recovery, and hence, usability. Some commonly used messaging systems are generically referred to as "exchanges" (for example, together with appropriate computer equipment, the Microsoft® Exchange Server™ family of software products may implement, in part, a messaging system (using one or more exchange type databases).

In practice, the usefulness of exchange messaging systems can be greatly limited in that certain failures of an Exchange Server (i.e. a server computer supporting an exchange type database) may cause all of the many users of that particular Exchange Server to lose ready access to their messages. In such a situation, they may be unable to conveniently send or receive any email until the relevant Exchange Server has fully recovered from the failure.

Since the underlying exchange storage mechanism uses at least one complex and large database, full recovery has typically required a complete and non-corrupted restoration of an entire database. Such recovery may need to include reprocessing of any and/or all message transactions and messages that may have been received by the Exchange Server but which may not have previously been backed up by applicable means.

In such circumstances, to recover a lost or corrupted database, an administrator may initially reload an older copy of the database(s)—typically from the most recently generated complete backup available. Exchange software may then be directed to read logfiles (electronic journals and the like) that contain representations of email messages sent or received since the prior complete backup copy was created. Exchange related software might then update copies of those messages into the appropriate "mailboxes" in the database in order to update the database and thus bring it current.

However, since such recovery may involve the application of sequential logfile data records to pseudo-random (mailbox determined) "locations" in the database, recovery time may become great. Moreover, speed of recovery may be limited by the random-access performance of the deployed database storage devices (such as the commonplace SSD memories). Many storage devices for databases are not at all optimized for random access methods. Recovery time also depends on the sheer size of the database logfiles, and therefore may tend to be proportionate to the elapsed time and to the intensity of user activity each since the most recent full backup was completed.

The problems alluded to above may be exacerbated by the use of very large databases such as are possible to create on mechanical disk storage devices. Exchange databases can grow to be quire large, as messages accumulate in per-user data repositories such as those commonly known in the art as "Inboxes".

In this context, it is useful to note that, for many users, email messages have a very limited period of active use. Emails received today may typically be interesting, and those of yesterday somewhat less so and so on. Consequently, most of the users' accesses may be to more recent email messages. Messages older than one week may be infrequently accessed, and their everyday value to a typical user may be largely archival in nature. Despite a rapid aging process, typical implementations of Exchange Servers store all email messages in a large database, or database group. This may lead to very large, and continually growing, databases. In such databases, email messages of various ages may occupy parts of the same database on storage devices having equally high-performance, with storage device allocation taking little account of likely frequency of access.

Such large, previously developed, exchange databases may be associated with a number of problems, some of which are described below.

In regards to recovery time: Large databases may be laborious to recover after a failure occurs, and recovery may become protracted. Depending upon the failure mode and the backup strategy deployed; a moderately sized enterprise exchange database may require an extended period such as hours or even days to recover. Use of large databases may result in an increased probability of recovery process failure prior to completion, thus introducing cascaded recovery issues and extended outage periods. Such events may have an adverse impact upon business activity dependent upon availability of email service.

In regards to storage cost: exchange databases are typically operated with fast (high-performance) storage devices in order to provide sufficiently quick response times to the users. Such high-performance devices may tend to be associated with higher costs. Fast storage devices may be needed both to ensure timely on-line responses to user requests and for supporting acceptably short recovery times. Whenever databases are permitted to grow very large, the cost of the database storage tends to become substantial and performance issues may arise.

In regards to backup contention: larger databases typically require longer back-up times. An enterprise may seek to avoid scheduled downtime for daily back-up processing by using a concurrent backup function such as may typically be provided by suppliers of exchange software. However, concurrent backup processes may interfere with timely responses to user requests and may act to reduce application performance especially in the case that an Exchange database is stored on rotating mechanical disk drive(s). Such performance impact may prevent concurrent backups during peak business hours. As a result, database logfiles may grow large and this may result in extended recovery times and increased risks such as of failure during a recovery itself.

In regards to recovery risk: Large databases are typically backed-up using removable mag. tape (magnetic tape) as a recording medium. Use of mag. tape requires good administrative management and provision for secure storage to contain the risks of misplacement, loss or failure of a backup medium. Loss or failure of backup media may prevent or hinder recovery of a secured exchange database. Large databases, long recovery times and complex procedures each exacerbate risk of database damage such as due to human error during an actual recovery procedure.

In regards to problems with quotas: in an attempt to control the burgeoning storage used for email messages on Exchange Servers, some administrators of Exchange Servers may impose a maximum size limitation upon per-user storage space (an upper bound on the size of each user's mailbox). Whenever such a policy is imposed, reaching a mailbox size limit may cause consequences for a user that may be annoying or harmful. To reinstate satisfactory operation a user may be forced to delete messages, or to select messages for archiving by software to one or more separate files (archives).

Desktop client software programs for PCs (Personal Computers) may be used with Exchange Servers. One such desktop client program, Microsoft® Outlook™, offers a capability for moving copies of emails from an exchange database on an Exchange Server to a local RDS (rotating disk storage) on the client user's own PC (the PC that runs his or her client program). Thus, a common method for achieving user quota compliance is for the user to use a client program archiving function to initiate the moving of some of the older messages from an exchange database to locally connected RDS on a client PC. In order to provide for an appropriate measure of resilience through redundancy, users may typically direct such files of archived messages be replicated using NAS (network attached storage) disks connected via a LAN (local area network, such as those embodied using IEEE 802.2 standards and colloquially known as Ethernet). IEEE is the well known Institute of Electrical and Electronic Engineers, which publishes technical standards and recommendations.

Such ad hoc archiving of copies of email messages may create management problems, and elevated costs and risks for the organization providing exchange services. For example, quotas may tend to lower user satisfaction as to the service provided, and user productivity may be reduced as a consequence of adding a burden (archiving and management tasks) to the workload of those users. Moreover, quotas may sometimes be only marginally effective at reducing database size. For example, a database that stores email messages for 5000 users and provides in the region of 50 Mbytes per user (equivalent to perhaps 30–45 days of email) may still require approximately a quarter of a Terabyte (250 Gigabytes or 2.0 E+12 bits) of storage device capacity.

Moreover, insufficient managed e-mail archives may increase legal risks and associated discovery costs. In legal proceedings, discovery processes may routinely compel a costly search through all existing e-mail archives. Uncontrolled e-mail archiving thus leads to huge legal searches that encompass not only Exchange Server databases and backup tapes but also, potentially, all the PCs in an entire enterprise. In some cases these legal searches have cost more than a million dollars.

In response to such risks and associated costs, some enterprises are moving to email message life-cycle management techniques. Businesses may contain control of email messages throughout their life cycle, by applying appropriate archival policies and deleting stored messages after expiration of a policy-defined archival interval.

Full backup is typically the method used for backing up an exchange database when using backup to, and recovery from, traditional storage devices such as mag. tape and RDS. Use of this method may require making a concurrent backup set of all exchange logfiles—and all of the contemporaneous exchange message stores. The inefficiencies of such an approach are readily apparent—since message stores can be extremely large, backup times can be protracted and require large capacity storage media such as mag. tape. The protracted time can easily become inconvenient and the probability of recording device failure may be substantially proportionate to data size. Moreover the consequential delays due to a recording failure may also be roughly proportionate to data size.

Similarly, on the recovery side, huge full backups may lead to long recovery times and increased probability of, and consequences of, failure.

Furthermore, the user of large capacity mag. tapes may require administrator intervention which may become, in turn, inconvenience and error prone. Thus, either procedural errors or media defects may cause a recovery process to manifest failure, either while data is being reinstated or when the recovery process subsequently runs a consistency check against the recovered database.

After backup restoration has been completed, a second part of recovery may be the restoration of transactions that have occurred after the last full backup. Email messages and other exchange transactions may typically be secured by writing representations thereof to log files (sometimes termed "logfiles"). Log files may be stored, for example, on designated RDS media. A log file may simply be a sequential record of unprocessed transactions in the order they occurred. Recovery processes may need to read each of these sequential transactions, and apply (typically write) each one to the appropriate message storage area (mailbox within the Exchange database) of the appropriate user. Other approaches to recovery and transaction journalizing may be applied to log file design.

In a scenario wherein a storage device holding an exchange database fails after a whole day's transaction have been completed, but prior to full database back-up, the server may be required in effect, to re-process the entire day's transactions. In previously developed solutions there may be no email service while this operation is in progress and users may be deprived of normal email service for an extended period.

Log files such as are used in exchange services are typically written and read using a SAM (sequential access method) which is a relatively fast method of using RDS. Applying logfiles to bring newly restored databases typically involves using the databases in a Random Access Method. Where Random Access Method is applied to RDS a great deal of physical read/write head movement is usually involved with consequential temporal inefficiency and overall low performance resulting. Consequently, the database storage disks may be a limited factor preventing rapid recovery of an interrupted exchange service. Random write performance of magnetic disk RDS may be limited to as few as 100 transactions per second and recovery times may be protracted.

SUMMARY

According to an aspect of the invention a message stored system comprising a network attached storage server and an exchange server are provided. The exchange server may comprise a rotating disk drive store; a solid state store comprising an exchange database; and a computing engine coupled to the rotating disk storage and the solid state store.

The computing engine may comprise a scheduler subsystem having programmed instructions operable to instance a software archiver subsystem and a software backup subsystem to execute alternatively.

The software achiver subsystem may have programmed instructions operable to relocate to a queue a first plurality of messages selected from the exchange database according to a criterion of age and further operable to relocate the first plurality of messages form the queue to the network attached storage server.

The software backup subsystem may have programmed instructions operable to partition the exchange database into a plurality of storage groups, and for each respective storage group comprising a second plurality of messages, to maintain a patch file and to copy a set of images of the second plurality of messages to a backup file, the patch file operable to record a plurality of transactions applied to the respective storage group throughout the period of the copy of the set of images.

According to a further aspect of the invention a method for a message storage system may be provided.

According to a still further aspect of the invention a set of computer executable codes embodied on a computer-readable medium for a message storage system may be provided.

BRIEF DESCRIPTION OF THE DRAWINGS

The accompanying drawings, which are incorporated in and constitute a part of the specification, illustrate an embodiment of the invention, and, together with the description, serve to explain the principles of the invention.

For convenience in description, identical components have been given the same reference numbers in the various drawings.

DETAILED DESCRIPTION

Figure 1:
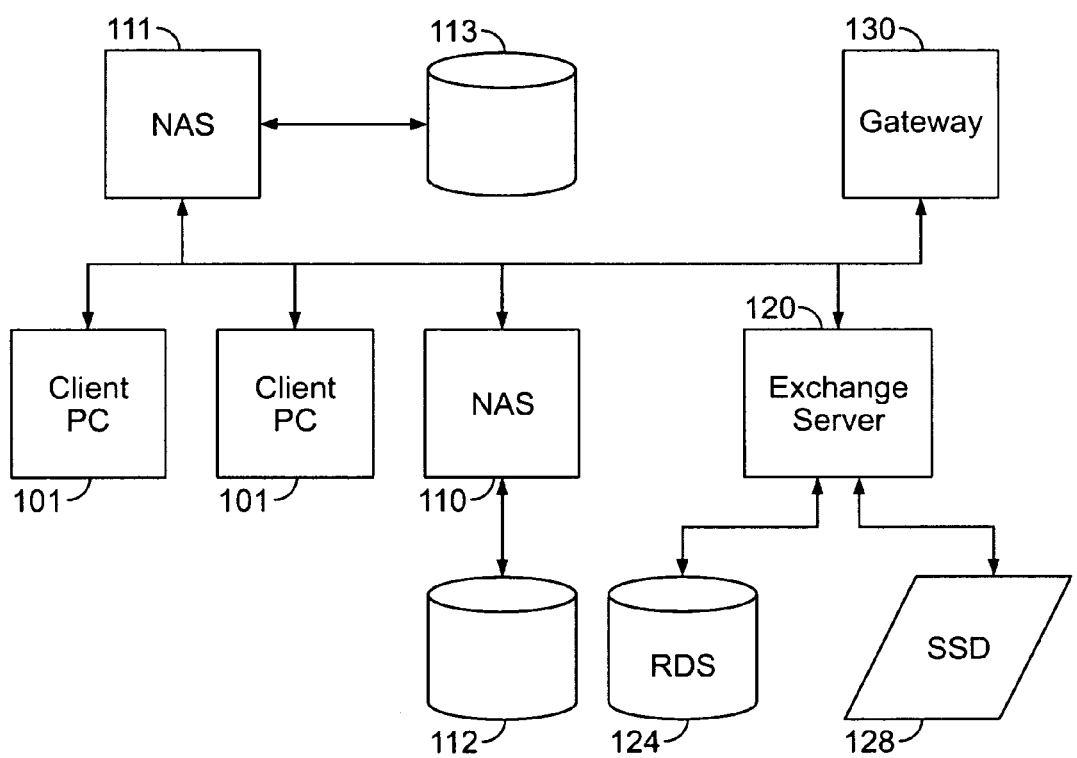
FIG. 1 depicts a combination of software and hardware that may be used to implement embodiments of the invention.

In the following description, for purposes of clarify and conciseness of the description, not all of the numerous components shown in the drawings are described in detail. The numerous components are shown in the drawings to provide a person of ordinary skill in the art a thorough, enabling disclosure. The operation of the components would be understood and apparent to one skilled in the art.

In various embodiments of the invention, structures and methods are provided for exchange databases.

According to an aspect on the invention an exchange service is provided having reduced likelihood of failure and superior recovery time from failure as compared with previously developed solutions.

According to a further aspect of the invention, an exchange service system uses particular software and hardware components utilizing smaller database sizes and reduced mechanical access delays during recovery failure as compared with previously developed solutions. "Exchange" is used here generically, not just in the context of Microsoft Corp. products.

Certain embodiments may provide divided databases having respective current and archival portions. In one embodiment a current database may contain only more recent copies of emailed messages. An archival storage portion of one or more databases may contain copies of emailed messages. In some embodiments full recovery may be archived in minutes rather than hours or days.

Fast and predictable recovery may require that the size of the current database portion remain below a particular established threshold. A component is a server-resident Archive Agent that may continually scan user message stores, and may transfer mail messages that are sufficiently aged according at least one particular criterion to an archival storage portion of one or more databases. Such archived messages may be removed from a current database portion and stored elsewhere, such as in any secure, high-availability, low-cost message storage facility that may be convenient. Such archived messages may remain user-accessible through a client software component.

Fast recovery may depend upon availability of a recent backup copy, and relatively small log files. An Archive Agent may be provided to include an automated backup scheduler that can perform continual backing up of an exchange database. Such backups may be performed more or less continuously i.e. starting a new backup as soon as the prior backup is complete or, alternatively, at a policy-managed interval or otherwise. A policy-managed interval may provide for optimizing recovery time, backup storage space and/or other tradeoffs. Preferably, frequent or continuous backups should occur while the database remains available for other purposes, especially servicing users. Preferably the backup operation should cause no discernible degradation in user response time.

In accordance with the considerations discussed above, embodiments may place the current exchange database on storage that is optimized for random I-O (input/output) operations.

FIG. 1 depicts a conventional system 100 of software and hardware that may be used to implement embodiments of the system and method disclosed herein. Multiple client PCs 101 may intercommunicate amongst themselves and other communicating nodes on a network 160.

An Exchange Server 120 may be equipped with storage devices such as RDS 124 an SSD 128, and provides email message services. The Exchange Server 120 may send and receive email messages to and from client PCs 101 and to wider email distribution points via a gateway computer 130 which may be connected to an internetwork such as the Internet. The Exchange Server may deploy an exchange database, in whole or part, upon the locally attached storage devices RDS 124 and SSD 128 which are typically attached by a high speed network such as FCA (Fibre-Channel Architecture).

The Exchange Server 120 and client PCs 101 may also communicate with NAS 112, 113 (Network Attached Storage) via NAS servers 110, 111 which may provide larger capacity storage but with lower overall performance than an SSD. Provision of more than one NAS server 110, 111 makes possible mirrored redundant storage, such as in accordance with the well known RAID-5 scheme thus providing storage with very high reliability and availability.

The use of SSD File Cache hardware such as a commercially available Solid Data® 9000 series File Cache may enable continual backup and rapid recovery. This combination of software and hardware may, in a typical large configuration, allow recovery from lost or corrupted Exchange data store in less than 15 minutes. A Solid Data® 9000 series File Cache is well suited to be an SSD storage device for an exchange database. Capable of 20,000 random I-Os (Input-Output transfer operations) per second and sustained data transfer rates in excess of 100 Megabytes per second, use of a Solid Data® File Cache as an SSD 128 makes possible very rapid database recovery.

When using embodiments of the invention, users may have access to archived emails using ordinary client PC software, alternatively, under administrative control, such access may be disbarred.

When using embodiments of the system, backups may be performed continually, without significant loss in user response time. The use of SSD file cache may act to permit minimization of log file size, and speedy database recovery.

By containing the online exchange database size the cost of the file cache may be contained within reasonable limits thus providing a superior price-performance as compared with previously developed solutions. The small database size also renders economically feasible the use of mirrored RDS's as the storage medium for full and frequent online backups. One half of the mirrored pair of RDS's may be remotely hosted so as to increase system resilience and security in depth. Need for backup tape drives and libraries may thus be reduced or eliminated.

Figure 2:
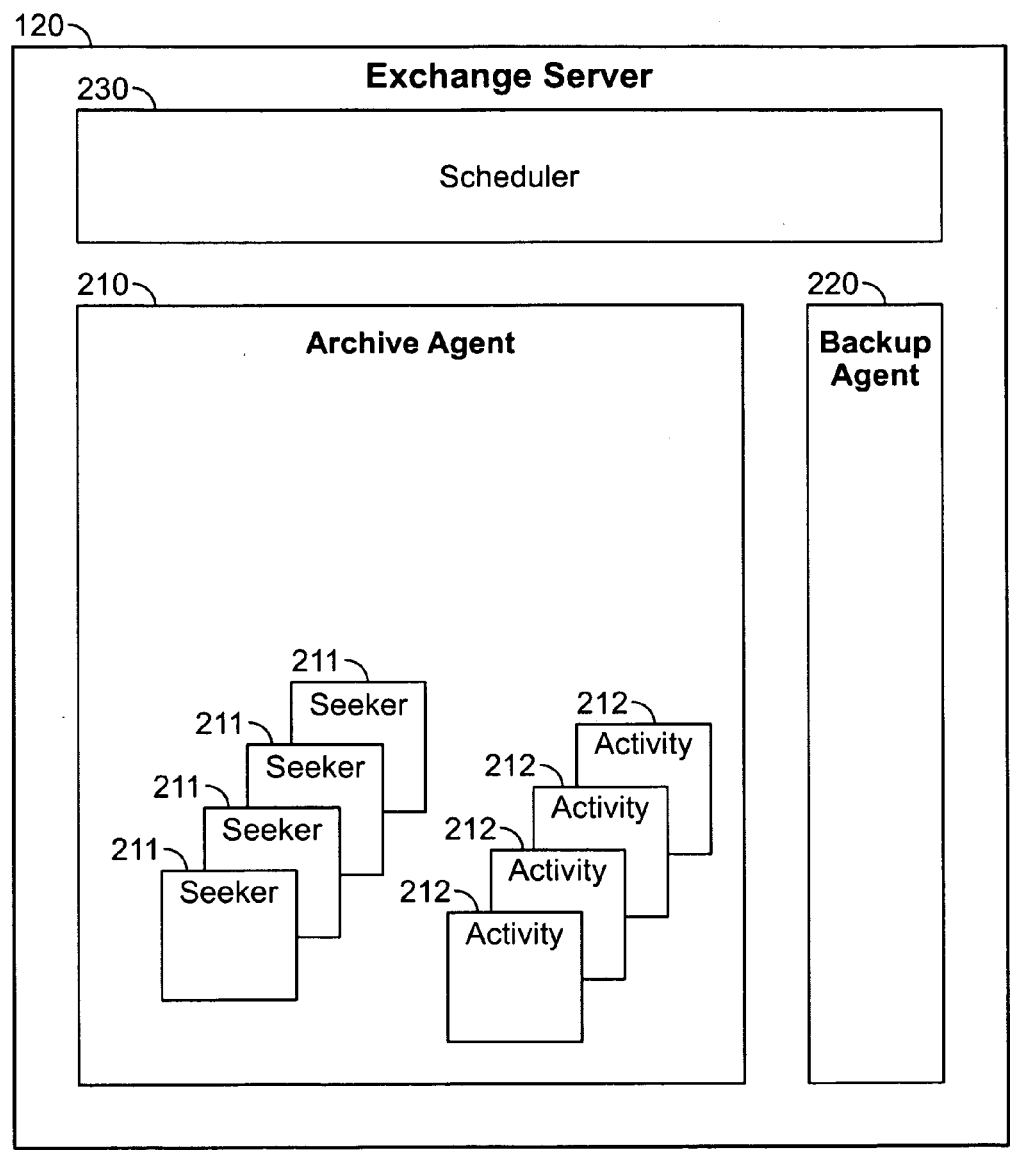
FIG. 2 depicts an Exchange Server such as the Exchange Server of FIG. 1.

FIG. 2 depicts in a block diagram an Exchange Server 120 such as the Exchange Server 120 of FIG. 1. Software components used to implement embodiments of the invention may run on an Exchange Server or equivalent servers. The software subsystems depicted include an Archive Agent 210 which may comprise multiple Seekers 211 and Archive activities 212, a Backup Agent 220 and a Scheduler 230.

In one embodiment, Archive Agent 210 is a software application. This exemplary Archive Agent 210 may be implemented to execute as a privileged service within an Exchange Server 120. It may be used with commonplace client PC email application programs such as the Microsoft "Outlook" client software. The Archive Agent 210 may scan conventional user "Inboxes", and may archive messages representing received or sent emails based on various criteria, such as email age and which criteria may be user controllable.

An Archive Agent 210 may automatically migrate email messages from the Exchange Server 120 to archival storage such as NAS 110 and this process may be administratively managed. By eliminating redundant copies of archived messages from the current database its size may be kept to a minimum. Messages may be archived at any convenient time especially when the system is lightly loaded and the redundant copies may be eliminated at a different convenient time such as when the storage space is needed especially when there are many bytes of incoming messages.

The archived messages may be removed from the exchange database and relocated to Network Attached Storage (NAS) server 110, typically based on RAID-5 disk arrays. Thus, in addition to speeding recovery on the Exchange Server 120, this approach establishes a storage hierarchy in which the bulk of the email messages reside on less-costly storage. Because the archived email messages are accessed much less frequently than current emails, the performance of the NAS storage is adequate to serve the limited access requirements.

Further, the archived data is stored, not in a single large database, but in a separate archive file for each user. Therefore recovery issues affecting one user's archives will not force recovery of all the archived messages, affecting the entire organization. Further, even a complete failure of the archived storage does not prevent the organization from sending or receiving current email messages. If desired, Outlook allows Users to access the archived messages from their Outlook window so from the user's desk, there is little difference between messages stored in the exchange and messages in the archive.

Figure 3:
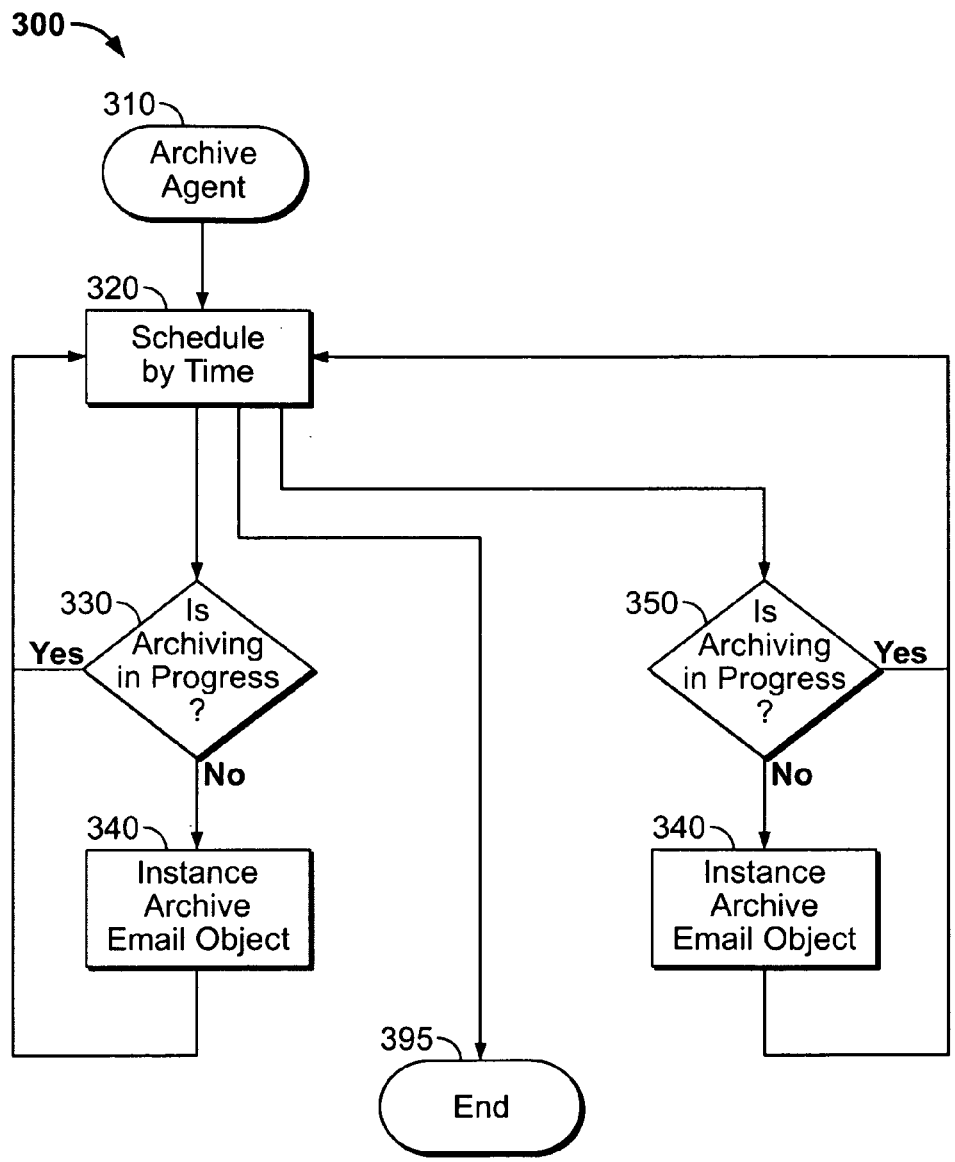
FIG. 3 is a chart that shows software such as may be used to implement an Archive Agent.

FIG. 3 shows a flow chart depiction of software such as may be used to implement an Archive Agent 210. An exemplary implementation of the Archive Agent is implemented in software adherent to Microsoft® proprietary APIs (Application programming interfaces). Such Microsoft® Exchange software conforms to the well known MAPI (Messaging Application Programming Interface) protocol, the exemplary Archive Agent may also be MAPI compliant and also may be compliant with the requirements of various software product certifications.

The Archive Agent 210 uses a complex but thread safe and multi-threading model. In one embodiment, the Archive Agent becomes active once in a 24 hour period. A single tagging thread scans all user mailboxes, marking all of the messages that have aged beyond the user selectable (watermark) time. Multiple archiving threads follow along behind the tagging thread, performing the actual archiving function.

The Backup Agent 220 may run in the background continually, backing up the exchange databases and log files. Thus the most current backup set may be never more than 1 hour out of synchronization with the exchange database. This may contain the data base recovery time when recovering from a backup set. Backup may take place while exchange is online to the user base. Continual backup is greatly facilitated by the SSD File Cache hardware. The high IOP (input-output operation rate) of the File Cache may allow the online backup to run continually or even continuously, without significant loss in user response time.

FIG. 3 shows the Archive Agent components and flows of control 300. In one embodiment, the Archive Agent (and the other software shown hereinafter) may be implemented using well known object oriented programming techniques using programming languages such as C++ or Java™.

At 310, the Archive Agent runs. At 320, a scheduler monitors the system time and compares it to user set schedules that launch various activities 212 (and make sure that only one instance of any activity 212 is active at any given time). Such activities 212 may include archiving of old (aged) email and/or exchange database storage system backup, and others. Each activity 212 may have its own individual components and flow.

At 330 it may have been determined that archiving of old emails is due so a check is made as to whether such archiving is in progress and if not so then control is passed to 340 which may instance an object for email archiving to perform the desired archiving.

Similarly, at 350 it may have been determined that backup of exchange database storage system is due so a check is made as to whether such backup is in progress and if not so then control is passed to 360 which may instance an object for backup to perform the desired backing up. In an exemplary embodiment the "ESEBackup" (Exchange Storage System Backup) object is instanced in accordance with object oriented software techniques.

The Archive Agent may operate indefinitely, or, according to some, possibly implementation dependent, criteria (not shown in FIG. 3) it may be determined that the actions of the Archive Agent are completed (at 395).

Figure 4:
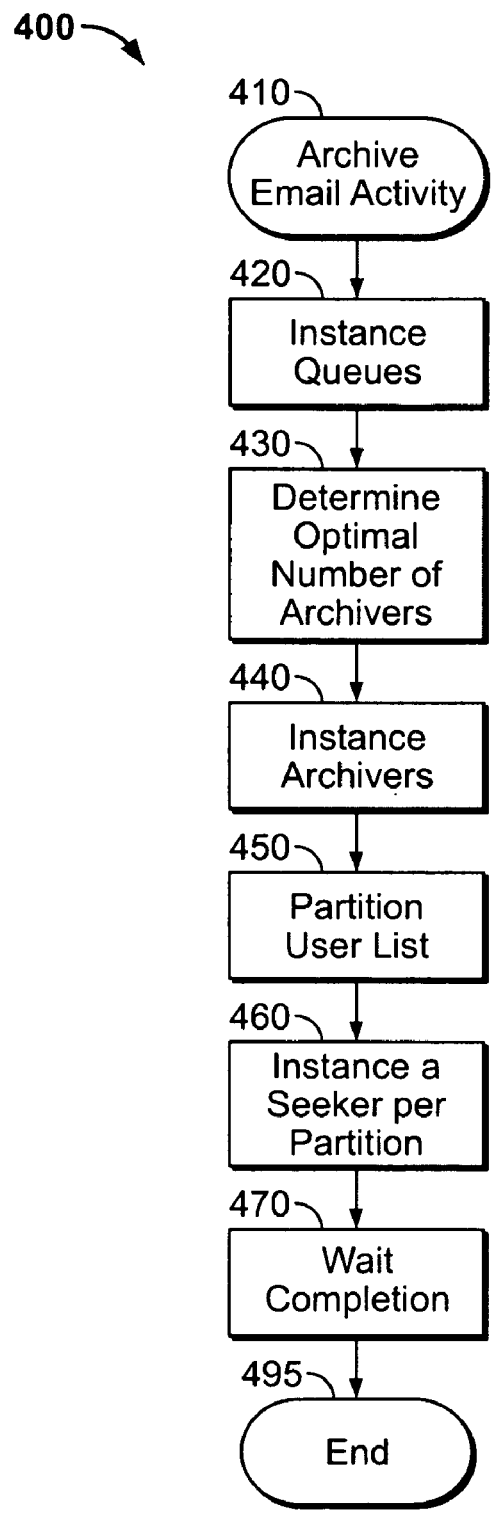
FIG. 4 is a chart that shows software for an instance of an Old Email Archiver object and corresponding flows of control.

FIG. 4 is a flow chart of software for an instance of an Old Email Archiver object and corresponding flows of control 400. Such an object may have been instanced as described above in connection at 330 (FIG. 3).

At 410, an Old Email Archiver runs. Each instance of Old Email Archiver has three mail components, namely Seekers, Archivers and queues. Seekers 211 generally act to identify archive tasks to perform. Archivers generally move to archival storage identified subsets of the message database(s).

Queues are used generally to communicate between Seekers 211 and Archivers and for similar purposes. At 420, the queues are instanced. The number of queues may be predefined or predetermined dynamically.

The number of Archivers (and also of Seekers 211) is user configurable and may reflect the users' environment, for example responsive to criteria such as system size and load. At 430, there is a determination made of the optimal number of Archivers to be used.

Still referring to FIG. 4, at 440, the required number of Archiver is instanced.

Each session Old Email Archiver begins by generating a list of all users. That list is partitioned up and given to the Seekers (to prevent overlap). At 450 the Archive email activity partitions the user list, one partition for each seeker. Then, at 460, the Archive email activity instances one Seeker for each partition of user list.

At 470, there is a wait for completion of the Archive email activity, and at 495, the Archive email activity is completed.

Figure 5:
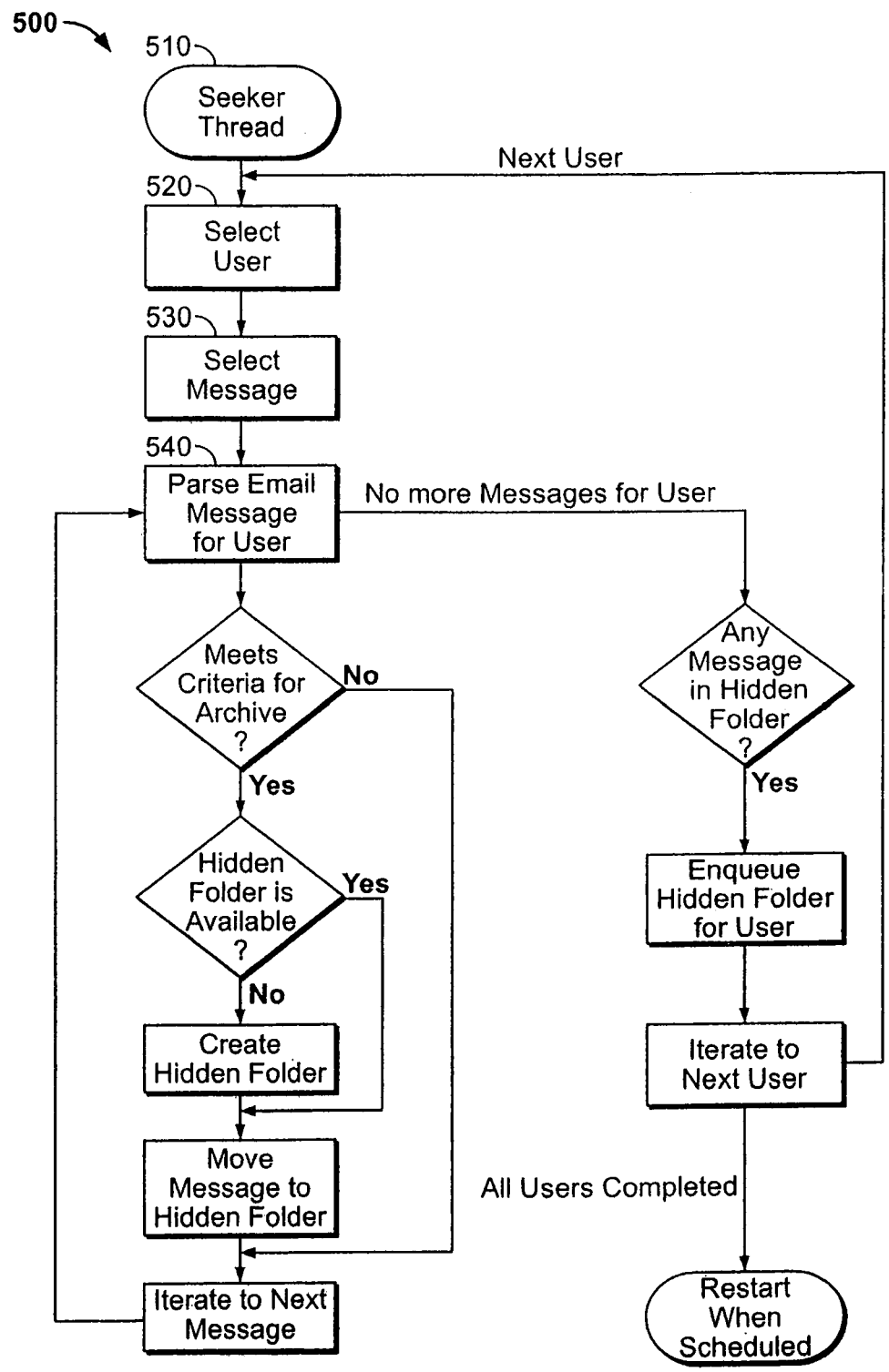
FIG. 5 is a chart that shows software for an instance of a Seeker object and corresponding flows of control.

FIG. 5 is a flow chart of software for an instance of a Seeker 211 object and corresponding flows of control 500. Such an object may have instanced as described above in connection with 460 (FIG. 4). Each Seeker instance goes through a user list partition to check for email that matches user defined selection criteria, for example, message age; read/unread status and/or location.

Thus, referring to FIG. 5, at 510, a Seeker instance thread commences execution. At 520, one user is selected from the partition. At 530, an email message belonging to that user is read from the database. At 540, the email message is parsed. At 550 the email message is analyzed to see whether it meets the criteria for archiving.

If and when each message meets all the criteria it is moved into a hidden folder for archiving and the user is placed onto the queue as follows. Assuming the message did indeed meet the criteria for archiving control passes to 552 in which there is a test to see if a hidden folder is available. If no hidden folder is available then control passes to 554, and a hidden folder is created and made available. At 556, the message is moved to the hidden folder, it remains available to the user through the ordinary client ware at this time even though the folder is hidden. At 558, the Seeker instance iterates to the next message and control returns to 540. If no messages were found to meet the criteria for a user then no reference to that user is placed on the queue.

When all of the email messages for a particular user have been parsed, control passes to 560. At 560, a check is made as to whether there is any message and associated hidden folder, and if so control passes to 562, otherwise control passes to 564. At 562 the User and its associated hidden folder are placed on the queue.

At 564 this Seeker object iterates to the next user and control returns to 520. At 595 the activity of the instance of the Seeker is completed and the instance will disappear until the new Seeker instance is created when scheduled by the Archive Agent.

Figure 6:
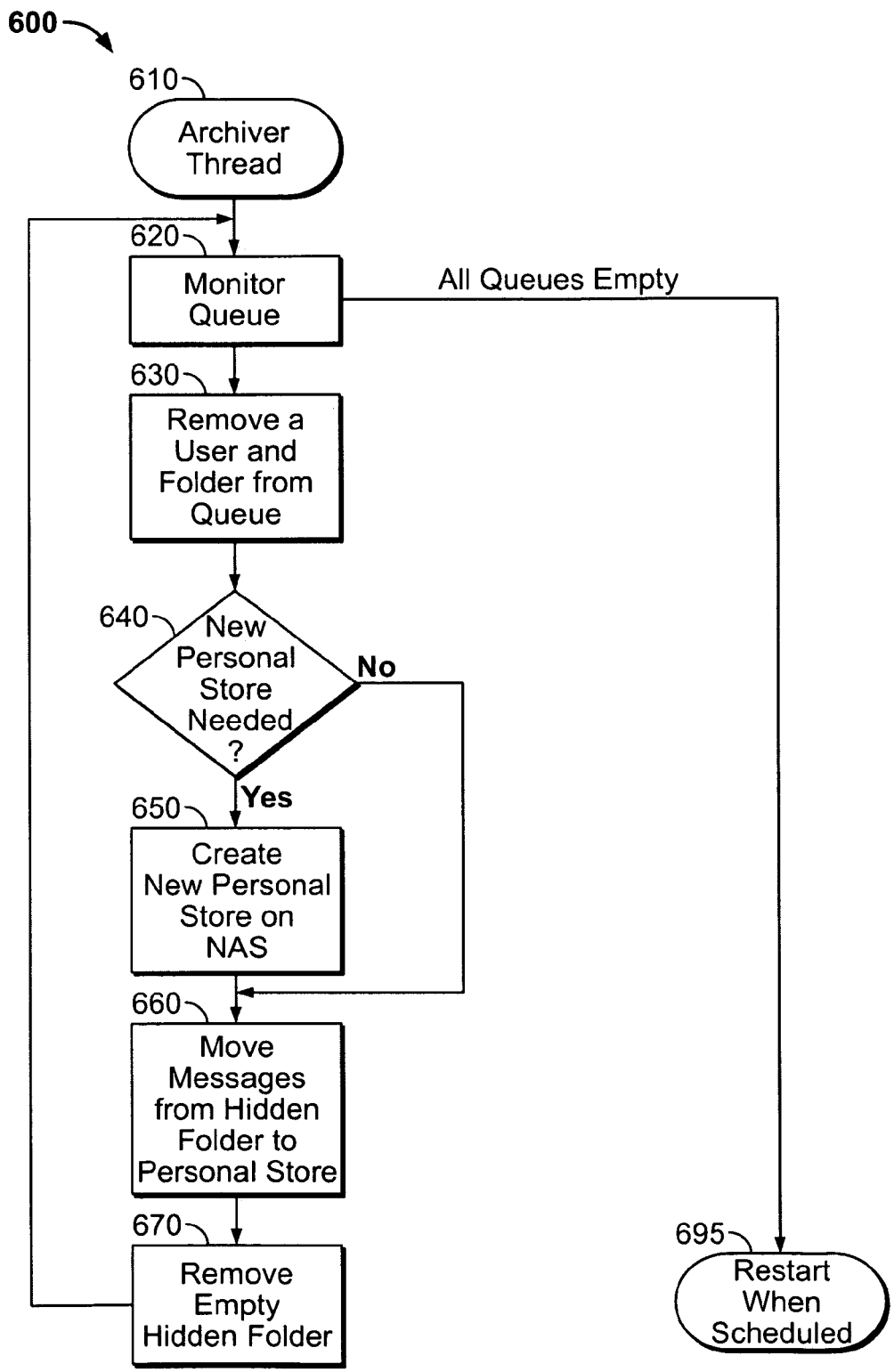
FIG. 6 is a chart that shows software for an instance of an Archiver object and corresponding flows of control.

FIG. 6 is a flowchart of software for an instance of an Archiver object and corresponding flows of control 500. Such an object may have been instanced as described above in connection 340 (FIG. 3).

Thus, referring to FIG. 6, at 610, an Archiver instance thread commences execution. At 620, the Archiver instance monitors the queue.

At 630, when a user is present the Archiver instance takes that user off the queue. At 640, a test is made to decide whether a new Archive PST (Personal STore or personal file of stored email messages) is needed. And if a new Archive PST is needed then at 650 it is created. At 660, the Archiver instance moves the messages found in the hidden folder the user's Archive PST. At 670, the hidden folder that is emptied and removed. This process continues with control passed back to 620, until complete at 695.

The above-described activities continue until all the Seekers 211 have exhausted their user lists and all the Archivers have depleted the queues. The Archive Agent activity can then remain dormant until the next scheduled time for archiving old emails, whereupon the process repeats indefinitely.

Figure 7:
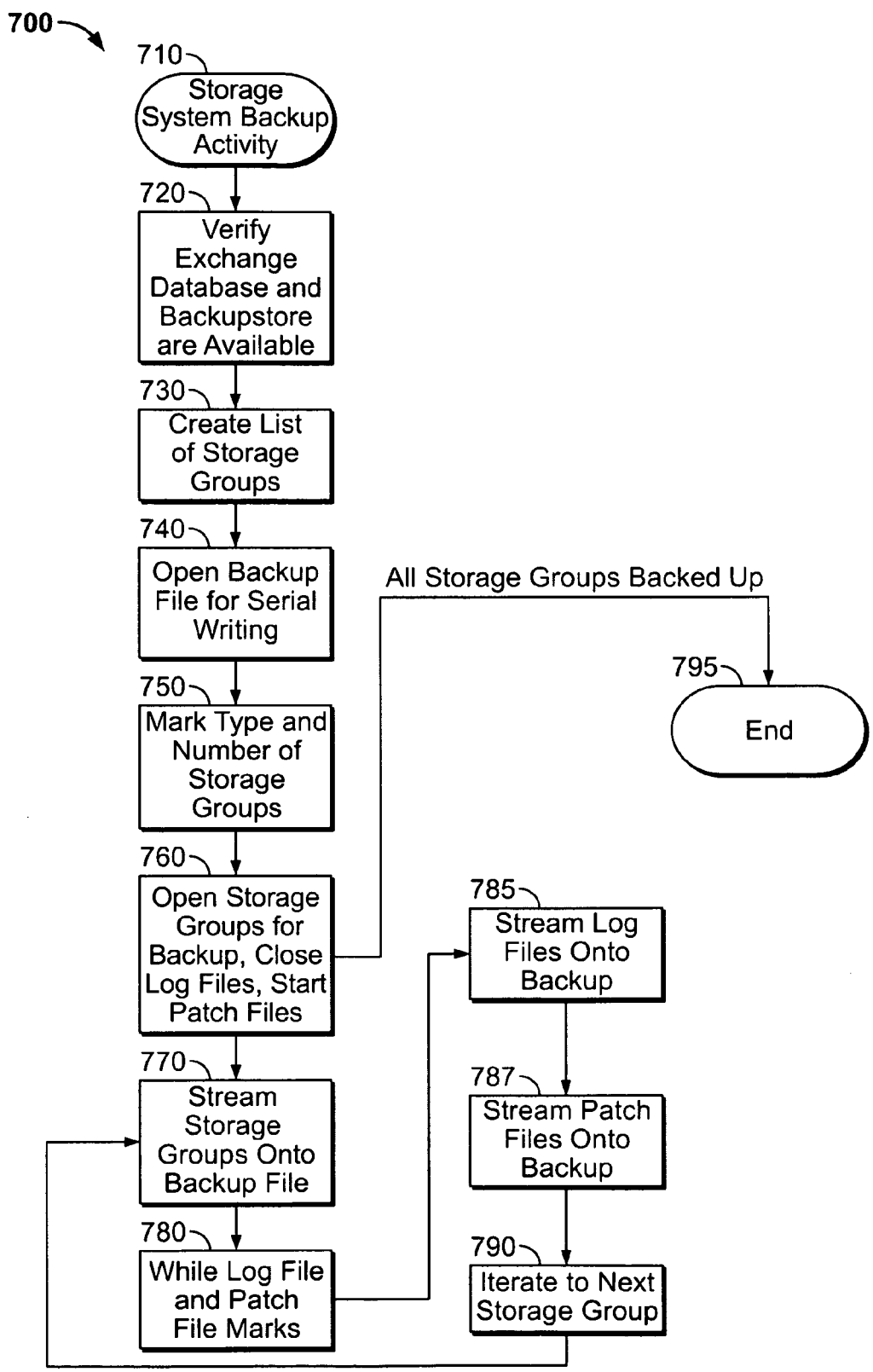
FIG. 7 is a chart that shows software for an instance of a Backup object according to an embodiment of the invention together with corresponding flows of control.

FIG. 7 is a flowchart of software for an instance of Backup object together with corresponding flows of control 700. Such an object may have been instanced as described above in connection with 360 FIG. 3). In an exemplary embodiment the Exchange Storage System Backup consists of one main object—the ESEBackup Object.

Software embodied within the exemplary ESEBackup object instance flow may be executed (shown commencing at 710) as a session. At 720 sessional software verifies that the exchange storage subsystem and backup stores are available.

At 730 the exchange subsystem may be queried so as to create a list of all storage groups pertaining to the exchange database.

At 740, backup file is opened for serial writing. The ESEBackup generally operates to manage the structure of data being stored in the backup file.

At 750, the types and number of storage groups being backed up are marked into backup. This may serve, inter alia, to facilitate parsing of the backup file during a restore operation.

Then, at 760, an iteration per storage group commences. This may include selecting a current storage group and starting patch files. Patch files may be used to record journalizing information for transactions to the database storage group which occurred during the Archive. Whereas logfiles are used to journalize transactions to the database which occurred between backups, patch files are used to generalize transaction to the database which occurred during an ESEBackup session.

At 770 a storage group is then opened for backup and sequentially streamed into the backup file.

Once the storage group has been completely read and the data written to the backup file, at 780 the log and patch files associated with that storage group are queried and a further mark may be added to the backup file to enumerate the log and patch files.

At 785, the log files are opened for reading and their images are streamed onto the backup file.

At 787, the patch files are opened for reading and their images are also streamed onto the backup file.

At 790, there is an iteration to the next storage group within the list of groups to be archived such as may have been created at a step associated with 730, above. Upon completion of all storage groups, at 795, the ESEBackup thread of execution ends and the instance is terminated.

Exchange recovery may involve restoring the information that was saved into the backup file. It may further involve "replaying" the log files to bring the exchange store up to a contemporary state. Replaying of log files, can take a great deal of recovery time. Embodiments of the invention may act to minimize the number of log fields resulting in fast recoveries.

The relevant software may be coded, by one of ordinary skill in the art, in light of this disclosure in any suitable programming language.

Although embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed as new and desired to be protected by Letters Patent of the United States is:

1. A message storage system comprising:
a network attached storage server; and
an exchange server coupled to the network attached storage server through a network, the exchange server comprising:
a rotating disk store;
a solid state store comprising an exchange database;
a computing engine coupled to the rotating disk store and the solid state store, the computing engine comprising:
a scheduler having programmed instructions operable to instance an archiver and a software backup to execute alternately,
the archiver having programmed instructions operable to relocate to a queue a first plurality of messages selected from the exchange database according to a criterion of age and further operable to relocate the first plurality of messages from the queue to the network attached storage server,
the software backup having programmed instructions operable to partition the exchange database into a plurality of storage groups, and for each respective storage group comprising a second plurality of messages, to maintain a patch file and to copy a set of images of the second plurality of messages to a backup file, the patch file operable to record a plurality of transactions applied to the respective storage group throughout the period of the copying of the set of images.

2. The system of claim 1 wherein the scheduler is further operable to prevent concurrent execution of the archiver and the software backup.

3. The system of claim 1 wherein the backup file resides on the rotating disk store.

4. The system of claim 1 wherein the backup file resides on the network attached storage server.

5. A method for message storage comprising the acts of:
instancing an archiver having programmed instructions operable to relocate to a queue a first plurality of messages selected from an exchange database located on a solid state store according to a criterion of age and further operable to relocate the first plurality of messages from the queue to a network attached storage server;
instancing a software backup having programmed instructions operable to partition the exchange database into a plurality of storage groups, and for each respective storage group comprising a second plurality of messages, to maintain a patch file and to copy a set of images of the second plurality of messages to a backup file, the patch file operable to record a plurality of transactions applied to the respective storage group throughout the period of the copying of the set of images; and
repeating the instancings periodically, whereby archive and backup activities are performed alternatively and periodically.

6. The method of claim 5 further comprising:
providing a scheduler operable to prevent concurrent execution of the software archiver subsystem and the software backup subsystem.

7. The method of claim 5 wherein the backup file resides on the network attached storage server.

8. A set of computer executable codes embodied on a computer-readable medium for a message storage system comprising:
a first set of instructions operable to instance an archiver having programmed instructions operable to relocate to a queue a first plurality of messages selected from an exchange database located on a solid state store according to a criterion of age and further operable to relocate the first plurality of messages from the queue to a network attached storage server;
a second set of instructions operable to instance a software backup having programmed instructions operable to partition the exchange database into a plurality of storage groups, and for each respective storage group comprising a second plurality of messages, to maintain a patch file and to copy a set of images of the second plurality of messages to a backup file, the patch file operable to record a plurality of transactions applied to the respective storage group through the period of the copy of the set of images; and
a third set of instructions operable to repeat the first set of instructions and second set of instructions periodically.

* * * * *